(12) United States Patent
Bevan

(10) Patent No.: US 10,902,367 B2
(45) Date of Patent: *Jan. 26, 2021

(54) SYSTEM AND METHOD FOR ENHANCED CUSTOMER EXPERIENCE WORKFLOW

(71) Applicant: VIRTUAL HOLD TECHNOLOGY SOLUTIONS, LLC, Akron, OH (US)

(72) Inventor: Wayne Bevan, Hollister, CA (US)

(73) Assignee: VIRTUAL HOLD TECHNOLOGY SOLUTIONS, LLC, Akron, OH (US)

( * ) Notice: Subject to any disclaimer, the term of this patent is extended or adjusted under 35 U.S.C. 154(b) by 462 days.

This patent is subject to a terminal disclaimer.

(21) Appl. No.: 15/445,892

(22) Filed: Feb. 28, 2017

(65) Prior Publication Data

US 2017/0270453 A1  Sep. 21, 2017

Related U.S. Application Data

(63) Continuation of application No. 15/268,606, filed on Sep. 18, 2016, now Pat. No. 9,582,779.

(60) Provisional application No. 62/310,775, filed on Mar. 20, 2016.

(51) Int. Cl.
  *G06F 15/16* (2006.01)
  *G06Q 10/06* (2012.01)

(52) U.S. Cl.
  CPC ... *G06Q 10/06316* (2013.01); *G06Q 10/0633* (2013.01)

(58) Field of Classification Search
  CPC .......... G06Q 10/06316; G06Q 10/0633
  See application file for complete search history.

(56) References Cited

U.S. PATENT DOCUMENTS

| | | | |
|---|---|---|---|
| 7,940,916 B2 | 5/2011 | Baker et al. | |
| 8,379,830 B1 | 2/2013 | Naik et al. | |
| 9,582,779 B1* | 2/2017 | Bevan | G06Q 10/06316 |
| 2008/0301549 A1 | 12/2008 | Czudak | |
| 2009/0064130 A1 | 3/2009 | Davis et al. | |
| 2013/0185187 A1* | 7/2013 | Vasinkevich | G06Q 40/04 |
| | | | 705/37 |
| 2014/0047028 A1 | 2/2014 | Buth | |
| 2015/0310445 A1 | 10/2015 | Chan et al. | |
| 2016/0232463 A1* | 8/2016 | McDonough | G06Q 10/0633 |

* cited by examiner

*Primary Examiner* — John B Walsh
(74) *Attorney, Agent, or Firm* — Brian R. Galvin; Galvin Patent Law LLC

(57) ABSTRACT

A system for enhanced customer experience workflows, comprising a workflow integration server configured to receive at least a plurality of customer interaction information, and configured to produce at least a plurality of interaction workflow events based at least in part on at least a portion of the customer interaction information, and configured to transmit at least a portion of the interaction workflow events via a network; wherein at least a portion of the customer interaction information is received from a customer interaction system, and at least a portion of the interaction workflow events are produced automatically, and at least a portion of the customer interaction information is received while an interaction is in progress, and at least a portion of the workflow events are produced and transmitted while the interaction is in progress.

7 Claims, 8 Drawing Sheets

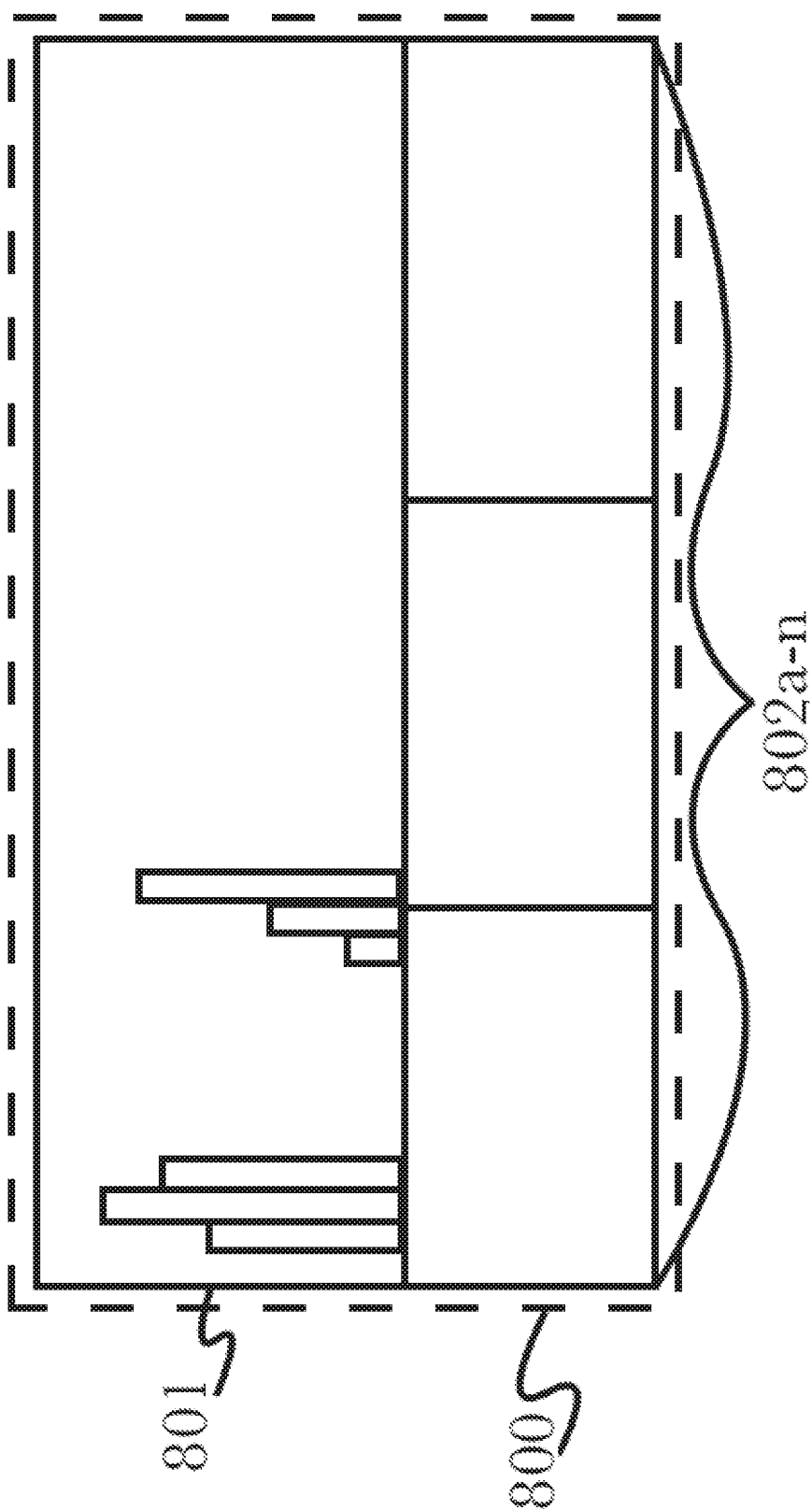

SYSTEM AND METHOD FOR ENHANCED CUSTOMER EXPERIENCE WORKFLOW

CROSS-REFERENCE TO RELATED APPLICATIONS

This application is a continuation of U.S. patent application Ser. No. 15/268,606 titled "SYSTEM AND METHOD FOR ENHANCED CUSTOMER EXPERIENCE WORKFLOW", filed on Sep. 18, 2016, which claims the benefit of, and priority to, U.S. provisional patent application Ser. No. 62/310,775, titled "SYSTEM AND METHOD FOR ENHANCED CUSTOMER EXPERIENCE WORKFLOW" and filed on Mar. 20, 2016, the entire specification of which is incorporated herein by reference in its entirety.

BACKGROUND OF THE INVENTION

Field of the Art

The disclosure relates to the field of customer interaction, and more particularly to the field of automating enhanced workflows based on customer interaction.

Discussion of the State of the Art

In customer interaction management, it is common for businesses to wish to implement analysis and influencing operations for various use cases, expediting customer requests and identifying metrics and areas of improvement through operational analysis. However, various approaches in the art require a great deal of custom configuration resulting in a high cost to implement, and tend to be very customer-specific causing migration issues and additional configuration needs.

What is needed, is a means to lower the cost to provide viable use case analysis and influencing from a given stream of events, and to operate on those events to produce non-customer-specific workflows and analysis thereof to optimize operations while improving customer experience.

SUMMARY OF THE INVENTION

Accordingly, the inventor has conceived and reduced to practice, in a preferred embodiment of the invention, a system and method for enhanced customer experience workflows that improves customer experience through automated real-time workflow triggering based on interactions and context.

According to a preferred embodiment of the invention, a system for enhanced customer experience workflows, comprising a workflow integration server comprising at least a plurality of programming instructions stored in a memory and operating on a processor of a network-connected computing device and configured to receive at least a plurality of customer interaction information, and configured to produce at least a plurality of interaction workflow events based at least in part on at least a portion of the customer interaction information, and configured to transmit at least a portion of the interaction workflow events via a network; wherein at least a portion of the customer interaction information is received from a customer interaction system, and at least a portion of the interaction workflow events are produced automatically, and at least a portion of the customer interaction information is received while an interaction is in progress, and at least a portion of the workflow events are produced and transmitted while the interaction is in progress, is disclosed.

According to another preferred embodiment of the invention, a method for enhanced customer experience workflows, comprising the steps of receiving, at a workflow integration server comprising at least a plurality of programming instructions stored in a memory and operating on a processor of a network-connected computing device and configured to receive at least a plurality of customer interaction information, and configured to produce at least a plurality of interaction workflow events based at least in part on at least a portion of the customer interaction information, and configured to transmit at least a portion of the interaction workflow events via a network, a plurality of customer interaction information; producing a plurality of interaction workflow events based at least in part on at least a portion of the customer interaction information; and transmitting at least a portion of the interaction workflow events via a network, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 8 is an illustration of an exemplary dashboard user interface for workflow administration.

DETAILED DESCRIPTION

Figure 1:
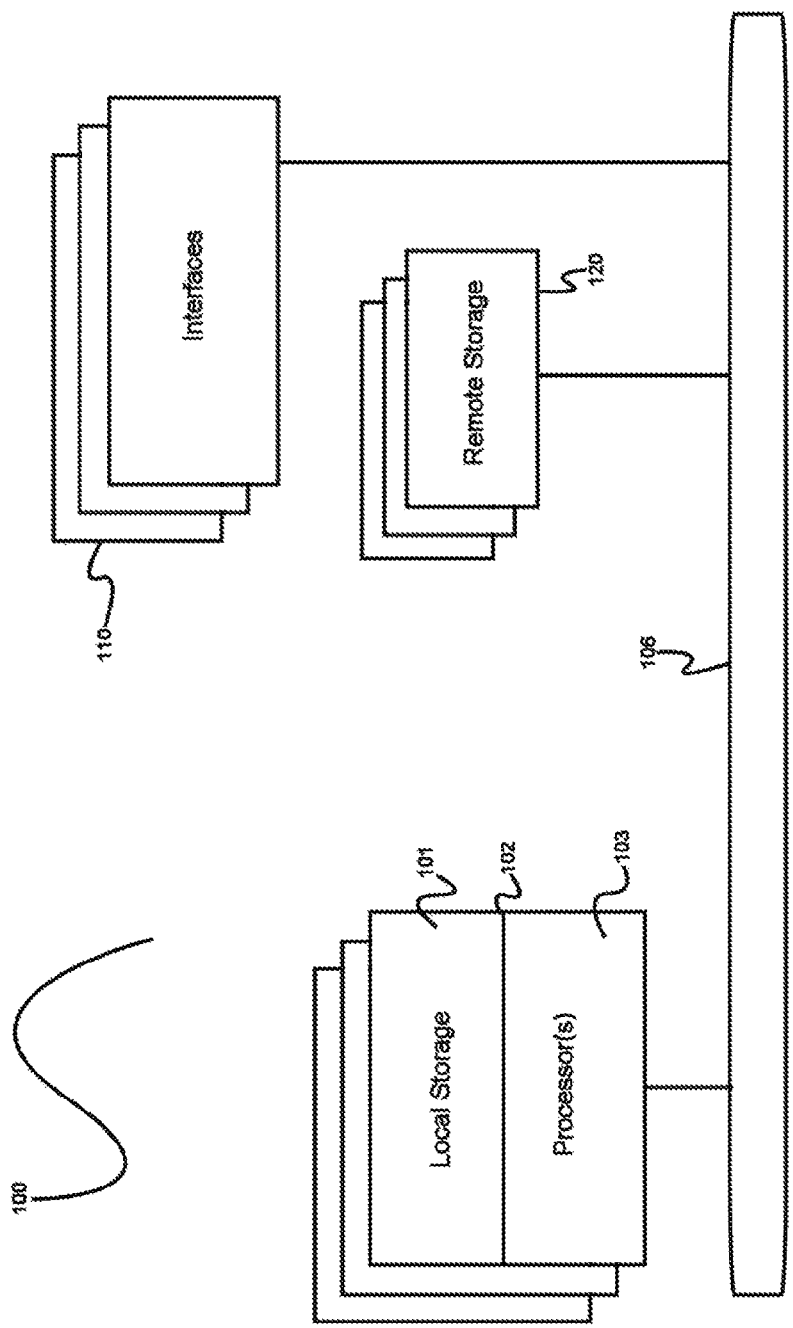
FIG. 1 is a block diagram illustrating an exemplary hardware architecture of a computing device used in an embodiment of the invention.

The inventor has conceived, and reduced to practice, in a preferred embodiment of the invention, a system and method for enhanced customer experience workflows that improves customer experience through automated real-time workflow triggering based on interactions and context.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

Figure 5:
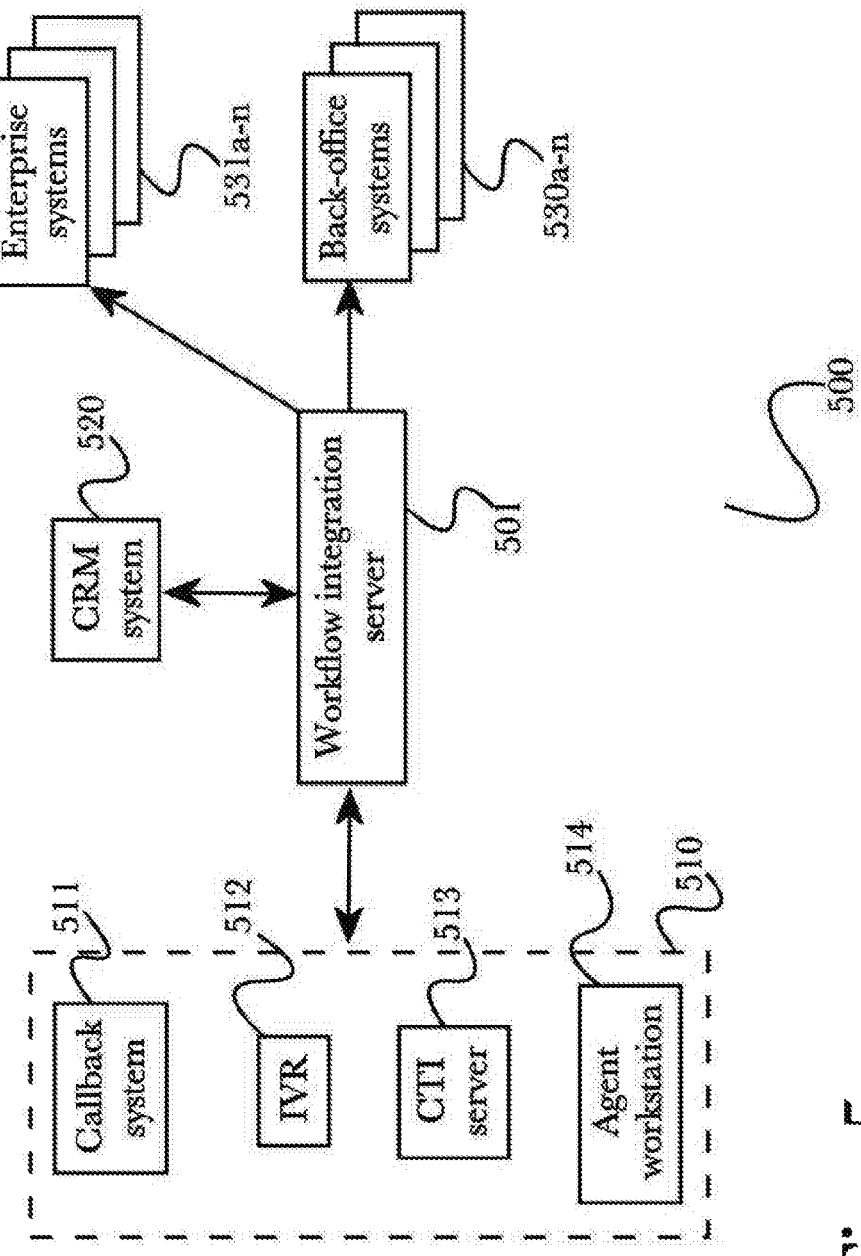
FIG. 5 is a block diagram of an exemplary system architecture for enhanced customer experiences workflows, according to a preferred embodiment of the invention.

FIG. 5 is a block diagram of an exemplary system architecture 500 for enhanced customer experience workflows, according to a preferred embodiment of the invention. According to the embodiment, a workflow integration server 501 may be utilized to communicate with a plurality of customer interaction systems 510 for example, a callback system 511 as may be utilized by a contact center or other enterprise to initiate outbound interactions with customers (for example, to follow up on previous calls or to provide further information or issue resolution), an interactive voice response (IVR) system 512 as may be used by a contact center to receive inbound customer interactions or to provide customers with self-service options (for example, troubleshooting information to help them without the need of a technical support specialist, or interactive billing information prompts), a computer telephony integration (CTI) server 513 that may be used to facilitate interaction between computer-based and telephony-based systems or services, or an agent workstation 514 such as an agent working within a contact center environment and interacting with customers.

Workflow integration server 501 may be connected to a customer relations management (CRM) system 520 that may store and provide customer-related information such as account details, contact information, previous interaction records, or other various customer information that may be relevant to a particular interaction or to a particular customer within an interaction. Workflow integration server 501 may also provide data to CRM system 520, for example to update customer information directly based on interaction information (for example, during the processing of a workflow event, as described below referring to FIGS. 6-7), enabling efficient integration with CRM resources without requiring manual operation by an agent or other user. Workflow integration server 501 may also communicate with a plurality of "back-office" systems 530*a-n*, such as automated or non-interactive systems operated by a contact center or enterprise for execution of tasks or providing normal function, such as (for example) a credit-check service used by a financial institution to process credit checks for customers, or a billing system used by an enterprise to produce and operate on customer billing details such as for the generation of recurring charges or production of invoices and enterprise systems 531*a-n*, for example, specialized enterprise systems 531*a-n* such as systems to aid in the contextual determination of a "next right action", or, a system to determine the semantic meaning of an event, and the like.

In this manner, workflow integration server 501 may be integrated with a number of enterprise systems to facilitate access to internal resources such as CRM and back-office systems, while also being integrated with customer interaction systems to receive interaction information or to provide information for use during an interaction. This integration may then be used to drive real-time workflow events during an interaction in progress, for example to automatically perform operational steps using back-office systems once a need is recognized during an interaction. For example, if a customer is exploring credit-checking options via an IVR, information may be requested from or provided to a credit-checking service automatically, without requiring direct action from an agent or other enterprise user, and without requiring a customer to locate and understand a self-service option to perform the action on their own.

DETAILED DESCRIPTION OF EXEMPLARY EMBODIMENTS

Figure 6:
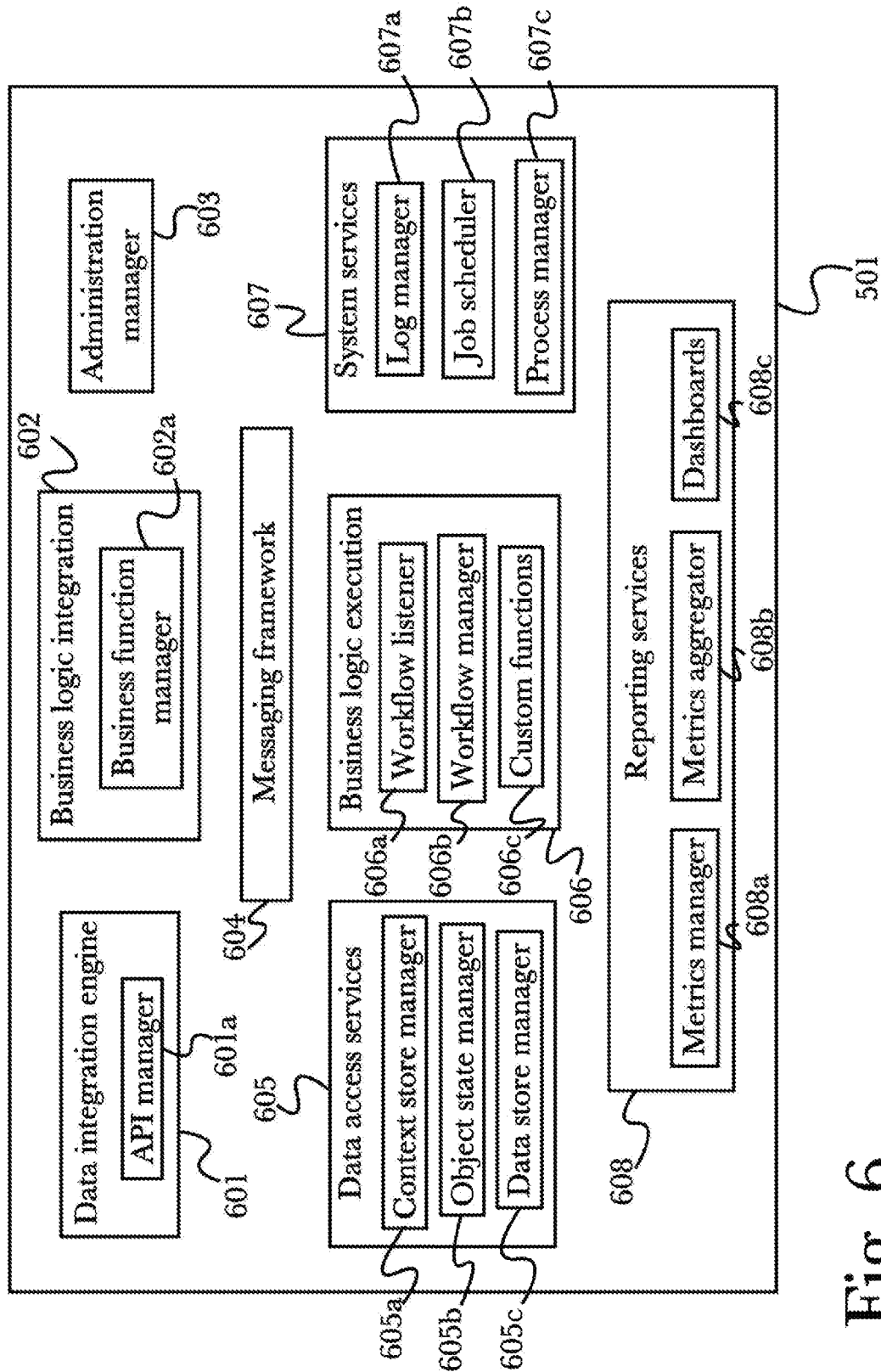
FIG. 6 is a block diagram illustrating an exemplary detailed view of a workflow integration server, according to an embodiment of the invention.

FIG. 6 is a block diagram illustrating an exemplary detailed view of a workflow integration server 501, according to an embodiment of the invention. According to the embodiment, a workflow integration server 501 may operate a number of internal components in a modular, service-based architecture to provide a variety of specific integration functionality according to a particular arrangement or use case, and it should be appreciated that components shown are exemplary and components may be added or omitted in various combinations to achieve a desired result.

According to the embodiment, a customer experience workflow may be used to analyze and act upon context and customer interactions in real-time, enhancing customer experience by making their interactions more immediately relevant and efficient, as well as improving results through automated handling to ensure customer requests are responded to in the optimal manner (for example, eliminating the risk of miscommunication when a customer interacts with a business representative who must manually fulfill their request). Workflows may utilize event-based triggers to execute actions, optionally using single or multiple events to qualify as a "start" condition (for example, triggering a particular action when a customer explores self-service options for technical support, but only if this is a "repeat caller" i.e., not the first time they've sought assistance with the same issue). Triggers may optionally be time-based, such as triggering an event only after a certain timeframe has passed or only if an interaction is still within a specified window, and workflows may be halted or abandoned based on time-based criteria (or other conditions or events). Workflows may be generally focused on customer actions, prompting automated responses to customer activities or requests in a reactive mode of operation that focuses on customer-oriented issue resolution and enhancing an overall customer experience. During workflow execution and handling, a variety of metrics may be produced (for example, through logging functions of various system components used while handling a particular workflow), and workflows may optionally be long-running or unrelated to a specific interaction as needed (such as a workflow that is handled while a customer is not in an interaction, to process information and fulfill requests from previous interactions or to initiate an outbound interaction to reach a customer for resolution, such as a follow-up to a prior tech support request that was unresolved at the time of the interaction). In some embodiments, a plurality of workflows may interact with each other. For example, one or more events may trigger new workflows to act as "event semaphores", for example, to allow execution to continue in other workflows, or alternatively to stop other workflows. An example of this function may be during a banking workflow for a customer applying for a new line of credit. As part of a credit application workflow, an event may trigger a separate "child" workflow for a credit check. Another event may trigger a child workflow for an account history examination with the financial institution. These workflows may complete and produce output information that is then incorporated into the initial credit application workflow, which may optionally either require triggered workflows to complete before being able to conclude itself, or may conclude separately so that each workflow produces a separate result, all of which may be further utilized after completion (for example, reviewed by a bank manager).

According to the embodiment, a messaging framework 604 may be used to provide communication capabilities across different functional components, for example using standardized messaging protocols or programming functions to provide internal integration of system resources within a workflow integration server 501.

A data integration engine 601 may operate (for example) an application programming interface (API) manager 601a to provide a plurality of APIs for use in integrating enterprise systems and workflow handling components. For example, an event submission API may be used to integrate a variety of enterprise systems so that events may be provided to them for further handling, such as to direct the operation of an enterprise system to carry out specified tasks. APIs may also be used to create dynamic contextual data and access dynamic or static rules-based data from various resources during operation. Data integration engine 601 may operate an API endpoint to receive workflow events such as triggers (for example, when particular actions are performed or keywords are entered during an interaction, or any other interaction event that may be used to trigger workflow actions), for example via a standardized HTTP-based interface for ease of integration with a variety of existing resources. Configuration may be minimized through the use of standard protocols and adaptive operation, so that resources may be quickly integrated without downtime or risking operation, and the use of such standardized, rapidly-deployable integration also enhances scalability for large arrangements with numerous resources, and system robustness through consistent configuration and operation.

A business logic integration engine 602 may further comprise (for example) a business function manager 602a, that may be used to enable external systems to execute business logic decisions within a workflow integration server 501 and to enable external systems to act on workflow results, and may utilize a plurality of RESTful APIs to facilitate integration with various business functions and systems (for example, using a standardized API for ease of integration with existing products or services). Additionally, business logic integration may be used to provide enhanced scalability and redundancy by operating multiple instances of business functions and distributing tasks or requests.

An administration manager 603 may be used to provide data access and system functional requests to an administrator interface, such as a web-based interface configured to allow an administrator user to view and interact with system information. For example, a user may be able to create lookup tables for database requests, modify users (such as to add users with specified privileges to aid in administration), modify workflow configuration (such as to modify event types or triggering parameters), or to modify integration configuration such as to add or remove connected services or to modify their operation (such as changing how a particular metric is recorded or a particular task is executed).

A plurality of data access services 605 may include (for example) a context store manager 605*a* to manage context-based event storage (for example, events that are only relevant to certain workflows based on the context of a customer interaction) as well as contextual operations such as customer identification management and event republishing (for example, propagating an event to other components for further handling or repeated execution according to interaction context), an object state manager 605*b* that may store and manage stateful customer-related data (such as, for example, a troubleshooting ticket that may require further handling and for which state-tracking may be important), or a data store manager 605*c* that may expose general low-level data to system components (such as to integrate with enterprise data stores at a lower level than would be feasible for a human user, for example to directly manipulate database tables or perform administrative system operations). A context store manager 605*a* may be used to handle a high volume and variety of data, that may be stored in a distributed fashion across a number of database nodes to provide data resiliency and increase performance through parallel operation. Such an arrangement may be optimized for querying and modifying unstructured data, which is particularly suitable to such operation according to the embodiment due to the quantity and varied nature of integrated resources that may be utilized. Operation may be configuration-free, using JSON or other standardized means to store context in its native format, further increasing robustness of operation by eliminating reliance on proprietary or modified protocols that may introduce compatibility issues or reliability concerns as they age (whereas standardized protocols may have industry support throughout their operational life).

A business logic execution manager 606 may further comprise (for example) a workflow listener 606*a* that listens for events (such as keywords or activities during a customer interaction) that may be used to trigger workflow events, a workflow manager 606*b* that may execute workflow events (for example, by performing workflow event handling and directing the operation of various integrated components or services to perform requested actions or provide information, or providing information or further workflow events to external enterprise systems for handling), or a variety of custom business functions 606*c* that may be used to integrate specific functions or capabilities of a particular enterprise or arrangement (such as proprietary internal products or services).

A plurality of system services 607 may include (for example) a log manager 607*a* that may be used to provide centralized logging during operation, job scheduler 607*b* that may schedule operations for automated execution, or a process manager 607*c* that may manage internal processes during operation such as to start, stop, restart, or audit processes or their results.

A plurality of reporting services 608 may include (for example) a metrics manager 608*a* that enables workflows and enterprise functions to generate and record metrics (for example, to log system performance or to quantify interaction or workflow details for easier and more effective tracking, scoring, or auditing), a metrics aggregator 608*b* that provides fixed aggregation periods (for example to periodically collate metricized data), or a variety of dashboards 608*c* to provide data for analysis by a human user or to receive interaction from a user (for example, to configure metric collection or presentation).

Figure 7:
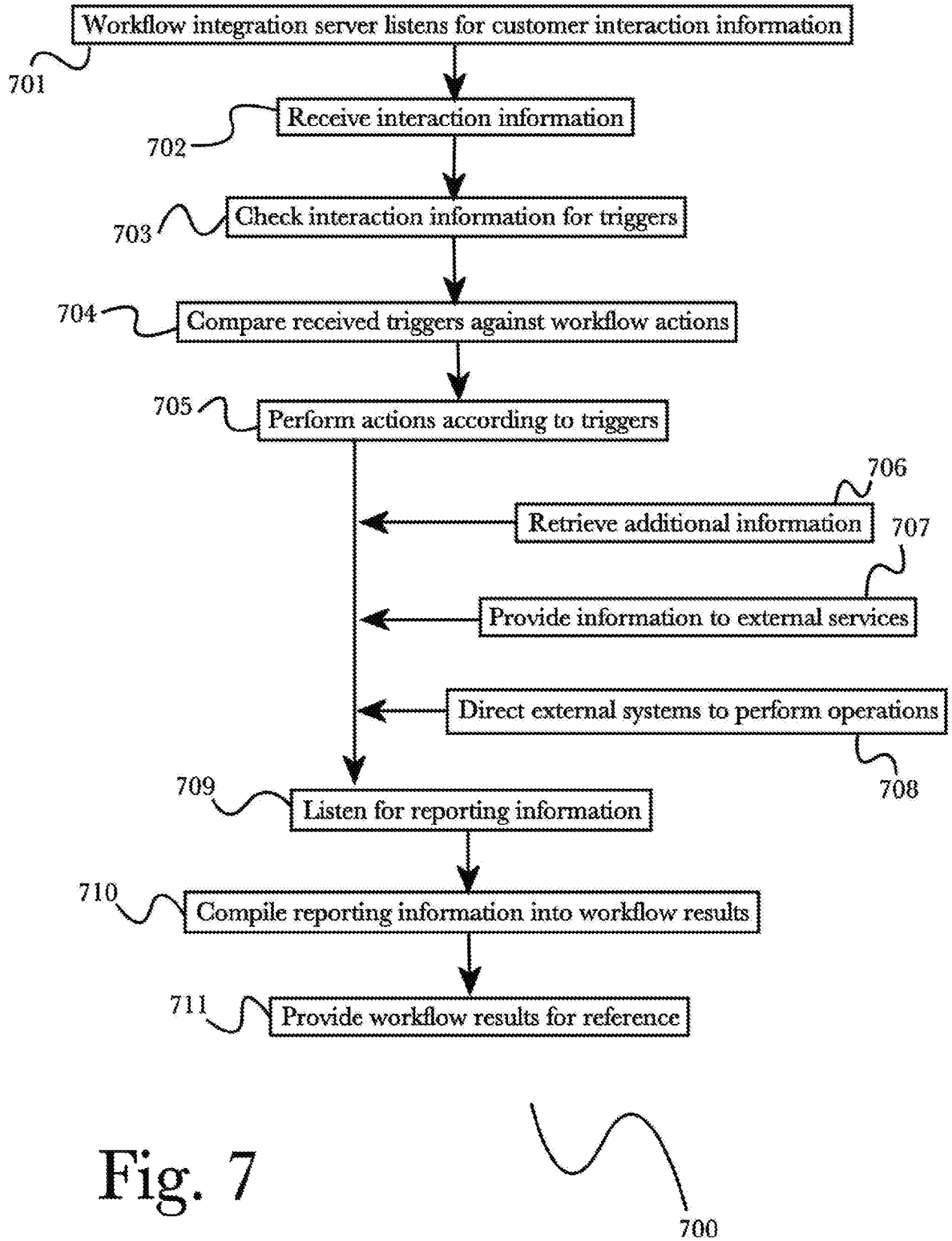
FIG. 7 is a flow diagram illustrating an exemplary method for enhanced customer interaction workflows, according to a preferred embodiment of the invention.

FIG. 7 is a flow diagram illustrating an exemplary method 700 for enhanced customer interaction workflows, according to a preferred embodiment of the invention. In an initial step 701, a workflow integration server may listen for customer interaction information such as audio calls, chat sessions, CRM data, or any other such information that may be available (for example, by being openly accessible for querying or by being directly provided to a workflow integration engine). In a next step 702, interaction information may be received, for example CRM data from a connected CRM system, audio interaction information from an IVR system, or chat session information from an agent workstation or a chat server. Workflow integration server may then examine received interaction information for any known triggers in a next step 703, for example configured keywords or phrases that may be found in audio or text interaction details. In a next step 704, any discovered triggers may be compared again known workflow actions, for example to determine what actions to perform upon detection of a trigger keyword, phrase, or activity (such as a customer clicking on a particular element in a user interface via a web browser application). In a next step 705, workflow actions may be performed based at least in part on received triggers, for example including (but not limited to) retrieving additional information 706 (for example, by requesting additional information from connected services or by retrieving information directly from a data source such as a database or an API that exposes information to external querying), providing information to external services 707 (for example, sending customer information to a connected service for specialized handling, such as for a credit check or order status request), or to direct external systems to perform specific operations 708, for example to direct a connected CRM system to retrieve additional customer accounts or details based on an ongoing interaction (for example, retrieving an account for a customer's family member or a secondary account they have based on an interaction context, such as if the customer is discussing transferring items between accounts).

In a next step 709, workflow integration server may listen for reporting information such as logs from external services that were utilized as part of a workflow (for example, if an external credit check service was directed to run a check for a customer, the workflow integration server may listen for results of the credit check to come back). Received reporting information may then be compiled into a workflow results report 710, for example including detailed information on workflow execution, custom interaction details that were utilized or observed, and the results of any workflow actions (such as the results of a credit check, or a confirmation of whether or not a customer's account was found or other such result information). In a final step 711, a report may be provided as output for reference, for example via a reporting interface for review by a human user (such as via a web-accessible interface viewable using a browser application), or for storage in a database for future reference.

FIG. 8 is an illustration of an exemplary dashboard user interface 800 for workflow administration. A dashboard interface 800 may be operated by a workflow integration server (optionally via the use of an integrated web server, for example) and may be configured to present a variety of information for review by a human user, and may optionally be configured to receive user interaction to direct the operation of a workflow integration server (for example, to enable an administrator to configure workflow triggers or actions).

For example, a plurality of workflow events may be shown 801, for example arranged by time period or number of occurrences, enabling a user to easily view what sort of events are being received or created by an enhanced customer experience workflow system. For example, events shown might include triggers that were received such as keywords, customer or agent activities, or time-based or multiply-dependent triggers, such as triggers that are only recognized when multiple conditions are met or when conditions are met within a specified timeframe. Other events shown may be workflow events that were produced by a workflow integration server, for example actions that were taken based on triggers, information events such as retrieving or providing information pertaining to a particular workflow or interaction, or instructions sent to integrated external services or systems for use in executing external workflow tasks (such as directing a credit check service to run a check for a customer). Additional information may be presented as a number of arranged categories or windows 802a-n, for example to organize specific events or information types and present them to a user in an arrangement for rapid viewing.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RANI).

Although the system shown in FIG. 1 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
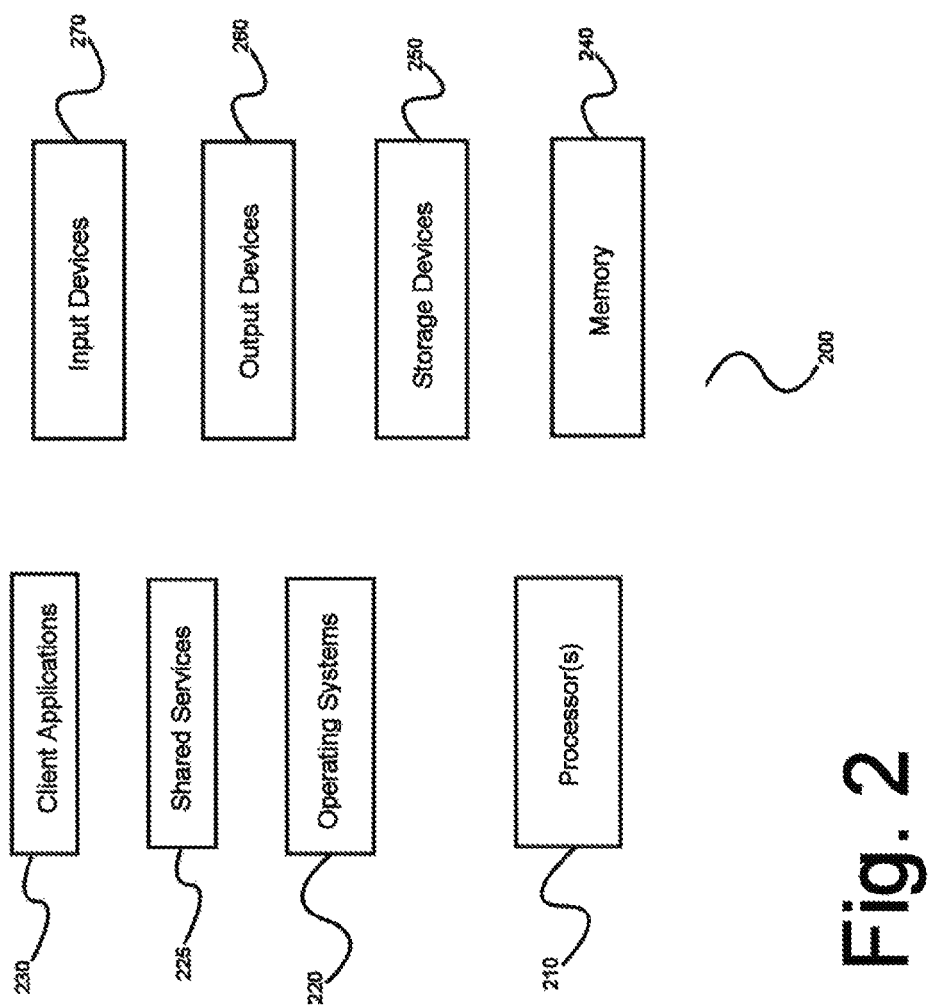
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 1). Examples of storage devices 26 include flash memory, magnetic hard drive, CD-ROM, and/or the like.

Figure 3:
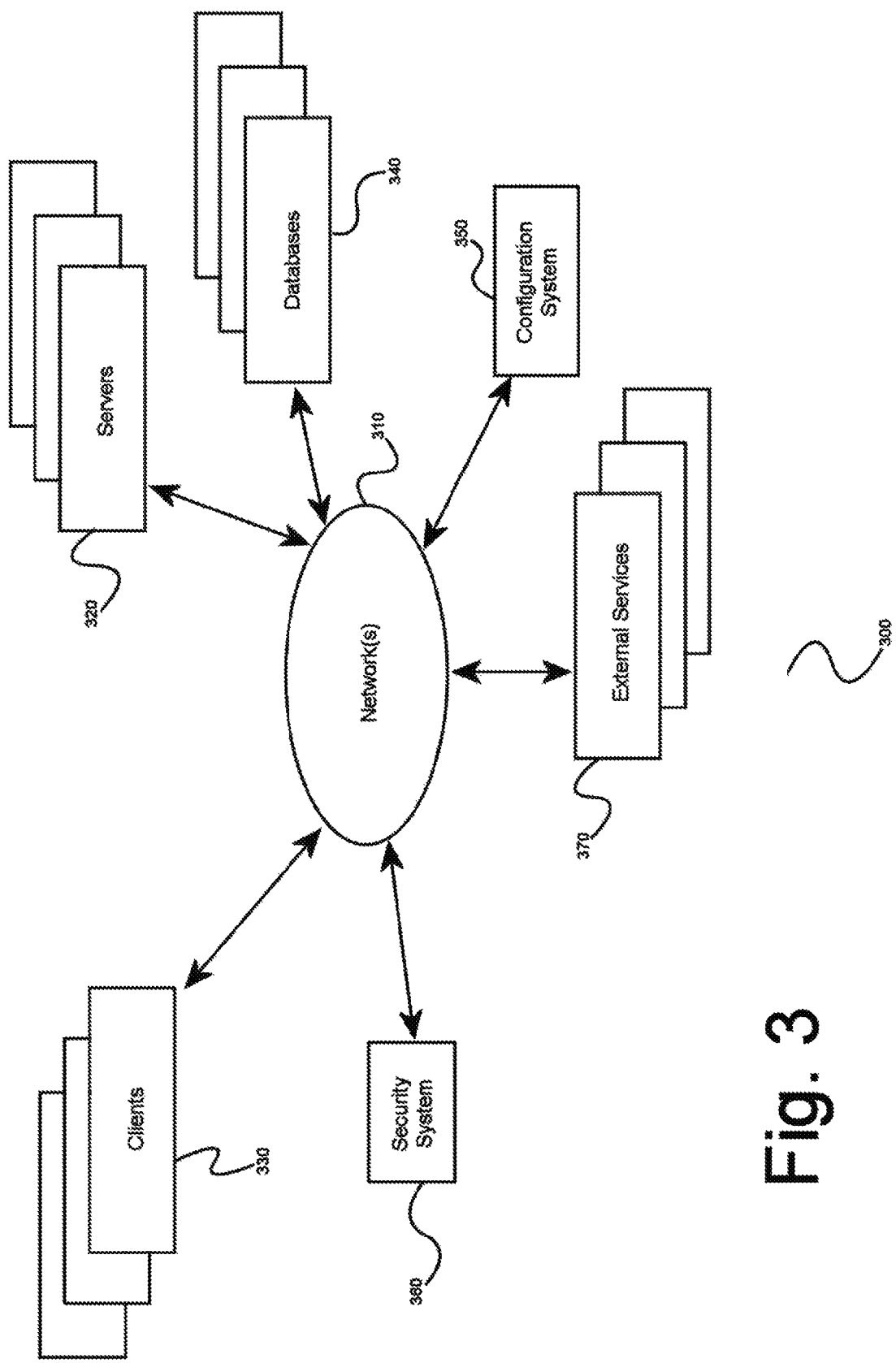
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 2. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 4:
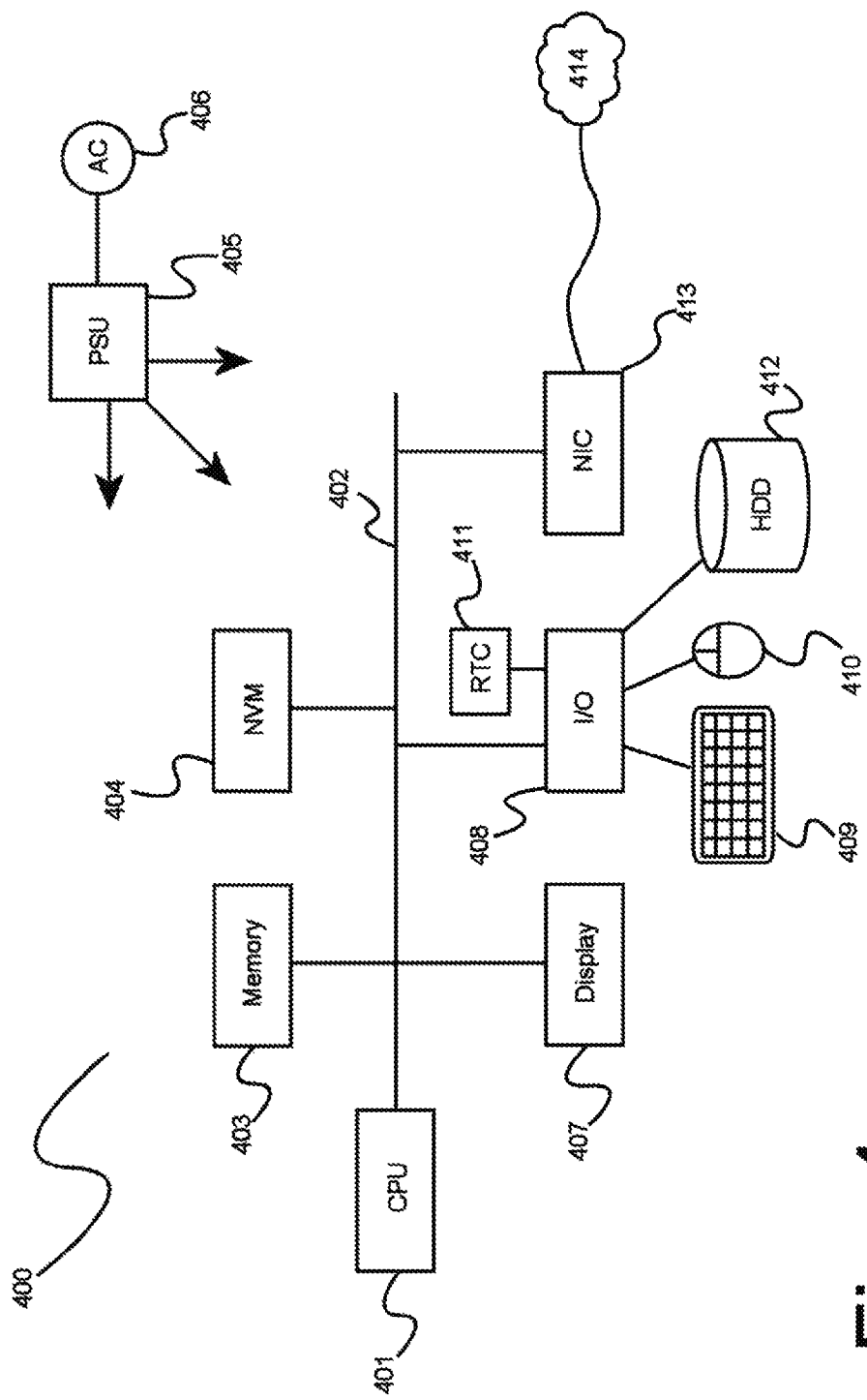
FIG. 4 is another block diagram illustrating an exemplary hardware architecture of a computing device used in various embodiments of the invention.

FIG. 4 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for enhanced customer experience workflows, comprising:
  a customer experience workflow integration server comprising a memory, a processor, and a plurality of programming instructions stored in the memory that, when operating on the processor, cause the processor to:
  retrieve an existing customer experience workflow, the customer experience workflow comprising a plurality of workflow actions, wherein each of the plurality of workflow actions specifies a plurality of customer experience workflow events which, when received, trigger execution of the respective workflow action;
  receive a customer experience workflow event resulting from an ongoing interaction with a customer;
  access a customer profile pertaining to the customer from a customer relationship manager;
  analyze data pertaining to the customer experience workflow using a business logic integration engine;
  modify the customer experience workflow based on results of the data analysis; and
  record the customer experience workflow in the customer profile.

2. The system of claim 1, wherein the business logic integration engine analyzes the customer experience workflow using a plurality of specific keywords.

3. The system of claim 2, wherein upon identifying a first keyword, an execution trigger, corresponding to the first keyword, is configured to execute one or more actions.

4. The system of claim 3, wherein a first action of the one or more actions commences a new customer experience workflow.

5. The system of claim 2, wherein upon identifying a second keyword, a time-based trigger, corresponding to the second keyword, is configured to execute an event in a second customer experience workflow after a specific time has elapsed.

6. The system of claim 2, wherein upon identifying a combination of two or more keywords of the plurality of keywords, a multiply-dependent trigger, corresponding to the combination of two or more keywords, is configured to execute one or more actions.

7. The system of claim 1, further comprising a reporting service wherein the reporting service compiles a customer experience workflow results report based at least in part on modified workflows.

* * * * *